United States Patent [19]

Sem et al.

[11] Patent Number: 5,530,647

[45] Date of Patent: Jun. 25, 1996

[54] METHOD OF DYNAMICALLY DETERMINING OIL CHANGE INTERVALS FOR INTERNAL COMBUSTION ENGINES

[75] Inventors: Thomas R. Sem, Plymouth; Jay L. Hanson, Bloomington; Doyle G. Herrig, Elko, all of Minn.

[73] Assignee: Thermo King Corporation, Minneapolis, Minn.

[21] Appl. No.: 279,584

[22] Filed: Jul. 25, 1994

[51] Int. Cl.$^6$ ............................................. F01M 11/10
[52] U.S. Cl. ................................ 364/424.03; 340/457.4
[58] Field of Search ..................... 364/424.01, 424.03, 364/424.04, 431.01, 509, 550; 73/116, 117.2, 117.3; 340/438, 450.3, 457.4; 123/196 S, 198 D

[56] References Cited

U.S. PATENT DOCUMENTS

| | | | |
|---|---|---|---|
| 4,506,337 | 3/1985 | Yasuhara | 364/550 |
| 4,706,193 | 11/1987 | Imajo et al. | 364/424.03 |
| 4,742,476 | 5/1988 | Schwartz et al. | 364/550 |
| 4,796,204 | 1/1989 | Inoue | 364/550 |
| 4,970,492 | 11/1990 | King | 340/450.3 |
| 5,060,156 | 10/1991 | Vajgart et al. | 364/424.03 |
| 5,123,251 | 6/1992 | Hanson | 62/89 |
| 5,123,252 | 6/1992 | Hanson | 62/89 |
| 5,123,253 | 6/1992 | Hanson et al. | 62/89 |
| 5,382,942 | 1/1995 | Raffa et al. | 340/457.4 |

*Primary Examiner*—Michael Zanelli
*Attorney, Agent, or Firm*—M. G. Panian

[57] ABSTRACT

A method of dynamically determining engine oil change intervals for an internal combustion engine having selectable high and low operating speeds HS and LS, respectively. The method includes the steps of accumulating operating time THS of the internal combustion engine at speed HS, accumulating operating time TLS of the internal combustion engine at speed LS, calculating a high speed factor HSF as a function of the accumulated engine operating time THS, and calculating a low speed factor LSF as a function of the accumulated engine operating time TLS. The method then sums the high speed and slow speed factors HSF and LSF to provide a sum S which is compared with a predetermined constant K1. A signal indicating the engine oil should be changed is provided when the comparison step finds the sum S has reached the predetermined constant K1. In a preferred embodiment, the method also includes the step of detecting when the engine oil of the internal combustion engine has been changed, and the step of resetting the accumulated high and low speed operating times THS and TLS, respectively, when the detecting step detects that the engine oil has been changed.

12 Claims, 3 Drawing Sheets

METHOD OF DYNAMICALLY DETERMINING OIL CHANGE INTERVALS FOR INTERNAL COMBUSTION ENGINES

TECHNICAL FIELD

The invention relates in general to internal combustion engines, and more specifically to a method of dynamically determining proper oil change intervals for an internal combustion engine.

BACKGROUND ART

In the transport refrigeration industry, an internal combustion engine, such as a diesel engine, commonly drives a refrigerant compressor at a selected one of two operating speeds, such as 1400 RPM and 2200 RPM, respectively called "low" and "high" speed. The speed selection is determined automatically by a temperature control algorithm. Thus, the percentage of operating time at each engine speed depends upon a plurality of factors, such as the characteristics of a load in a cargo space being conditioned by the transport refrigeration unit, the set point temperature of the conditioned space, the ambient temperature, the opening of an access door to the conditioned space during cargo transfers, and the like. Simply changing the engine oil based upon a fixed number of operating hours of the engine would result in a waste of oil when the oil change interval is too short, and it would reduce the useful operating life of the engine when the oil change interval is too long.

Thus, it would be desirable, and it is an object of the invention, to provide a new and improved method of determining oil change intervals, based upon the actual operating conditions of the engine during each measured oil change interval. It would also be desirable, and is another object of the invention to provide a visible indication or alarm, when the method determines that an oil change should be made.

SUMMARY OF THE INVENTION

Briefly, the invention is a method of dynamically determining engine oil change intervals for an internal combustion engine having selectable high and low operating speeds HS and LS, respectively. The invention includes the steps of accumulating operating time THS of the internal combustion engine at speed HS, accumulating operating time TLS of the internal combustion engine at speed LS, calculating a high speed factor HSF as a function of the accumulated engine operating time THS, calculating a low speed factor LSF as a function of the accumulated engine operating time TLS, summing the high speed and slow speed factors HSF and LSF to provide a sum S, providing a predetermined constant K1, comparing the sum S with the predetermined constant K1, and providing a signal indicating the engine oil should be changed when the comparison step finds the sum S has reached the predetermined constant K1.

While authorized personnel may reset the accumulated operating times when an oil change is made, in a preferred embodiment of the invention, the method further includes the step of detecting when the engine oil of the internal combustion engine has been changed, and the step of resetting the accumulated high and low speed operating times THS and TLS, respectively, when the detecting step detects that the engine oil has been changed.

In the preferred embodiment of the invention, the step of calculating the high speed factor HSF includes the steps of providing a predetermined constant K2, and multiplying the accumulated high speed operating time THS with the predetermined constant K2, and the step of calculating the low speed factor LSF includes the steps of providing a predetermined constant K3, and multiplying the accumulated low speed operating time TLS with the predetermined constant K3.

BRIEF DESCRIPTION OF THE DRAWINGS

The invention will become more apparent by reading the following detailed description in conjunction with the drawings, which are shown by way of example only, wherein:

FIG. 4 is a ROM map which lists certain of the constants utilized in the operation of the programs shown in FIGS. 2 and 3; and FIG. 5 is a RAM map which lists certain of the flags, timers, variables, and the like, generated during the operation of the programs shown in FIGS. 2 and 3.

DESCRIPTION OF PREFERRED EMBODIMENTS

Figure 1:
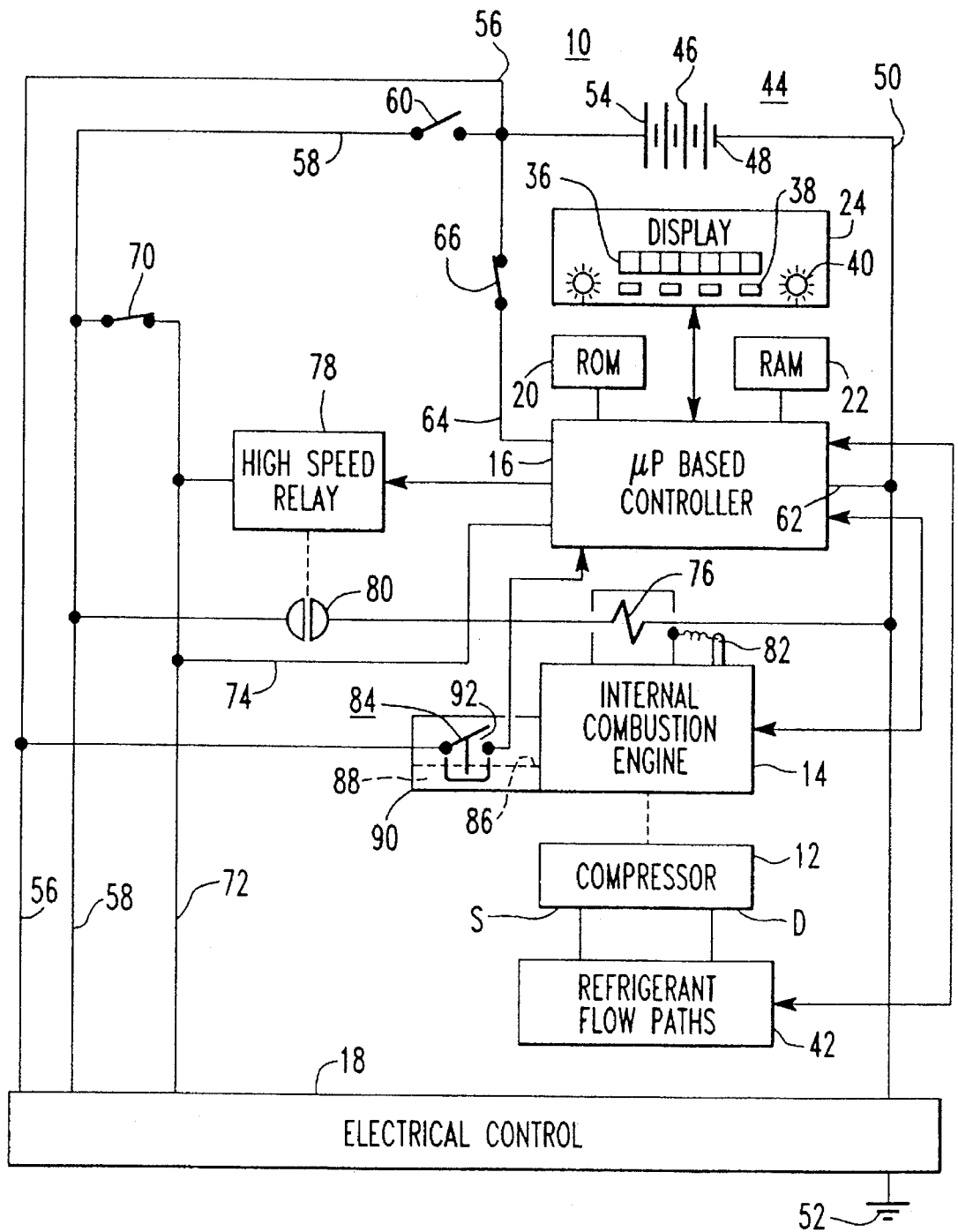
FIG. 1 is a partially block and partially schematic diagram of a transport refrigeration unit having an internal combustion engine operable to function as a dual speed prime mover of a refrigerant compressor, which engine may have oil change intervals dynamically determined and signaled according to the teachings of the invention.

Referring now to the drawings, and to FIG. 1 in particular, there is shown a partially schematic and partially block diagram of a transport refrigeration unit 10, such as a refrigeration unit for a truck, trailer, container, and the like. Transport refrigeration unit 10 includes a refrigerant compressor 12 driven by an internal combustion engine 14, such as a diesel engine.

Transport refrigeration unit 10 is controlled by a microprocessor based controller 16 and associated electrical control 18. Controller 16 includes a read-only-memory (ROM) 20, a random-access-memory (RAM) 22, and an interactive display 24. ROM 20 stores application programs, look-up tables, and the like, including application programs 26 and 28 shown in FIGS. 2 and 3, respectively, and a look-up table 30 of program constants illustrated in a ROM map 32 shown in FIG. 4. RAM 22 stores timers, flags, variables, and the like, with these variables which are generated during the operation of programs 26 and 28 being shown in a RAM map 34 in FIG. 5. Display 24 includes an alpha-numeric read-out 36, such as for displaying a selected set point temperature, alarm codes, and the like, push buttons 38 for interactive communication by authorized personnel with controller 16, and visual indicators and alarms in the form of indicator lights 40.

FIG. 1, as will be further described, illustrates only those elements of controller 16 and electrical control 18 which are necessary in understanding the teachings of the invention. Details of controller 16, display 24, refrigerant flow paths 42 connected to discharge and suction ports D and S, respectively, of compressor 12, temperature control algorithms, guarded access techniques for authorized personnel to communicate interactively with controller 16 and the like, are set forth in U.S. Pat. Nos. 5,123,251; 5,123,252, and 5,123,253, which are assigned to the same assignee as the present application.

More specifically, electrical control 18 includes an electrical power supply 44 having a battery 46. Battery 46 has a first side 48 connected to the portion of electrical control 18 shown in block form via a conductor 50 which is grounded at 52, and a second side 54 connected to electrical control 18 via a conductor 56. The second side 54 of battery 46 is also connected to selectively energize a conductor 58 via a unit on/off switch 60. Controller 16 is also directly connected to the first and second sides 48 and 54 of battery 46 via conductors 62 and 64, with conductor 64 including an on/off switch 66 accessible only to authorized personnel.

When it is desired to place transport refrigeration unit 10 under the control of controller 16, an operating mode selector switch 70 is operated to a position which connects conductor 58 to a conductor 72. A conductor 74 is connected from conductor 72 to controller 16, with conductor 74 being energized when the unit on/off switch 60 and the controller selector switch 70 are both closed. Thus, controller 16 is "notified" by the voltage level of conductor 74 whether or not unit 10 has been placed in operation by unit on/off switch 60, and that operation by controller 16 has been selected by selector switch 70. Controller 16 selects the operating speed of internal combustion engine 14 by selectively energizing a high speed solenoid 76 via a high speed relay 78 having a normally open contact 80. High speed relay 78 is connected between conductor 72 and controller 16, with controller 16 providing sinking current for high speed relay 78 when controller 16 desires to run internal combustion engine 14 at the high speed setting. High speed solenoid 76 is connected between power supply conductors 58 and 50 via the normally open contact 80 of high speed relay 78, with high speed solenoid 76 being linked to a throttle 82 on engine 14.

In the operation of transport refrigeration unit 10, an operator closes switch 60 when unit 10 is to be operated, and when selector switch 70 is actuated to the position which selects control by controller 16, controller 16 selectively operates engine 14 at low and high speeds as required by a temperature control algorithm. When high speed solenoid 76 is de-energized, engine 14 runs at low speed, and when high speed solenoid 76 is energized, it moves engine throttle 82 to a predetermined high speed position.

An oil level switch 84 is arranged to be responsive to a level 86 of lubricating oil 88 disposed in a crankcase 90 of engine 14. Oil level switch 84 is connected between the continuously energized conductor 56 and controller 16 via an electrical contact 92 of oil level switch 84. Contact 92 is open when the oil level 86 is in an acceptable range, and closed when oil level 86 is below the acceptable range. Thus, oil level switch 84 provides an input voltage to an input port of controller 16 in the event the oil level 86 drops below the acceptable level. It will be noted that controller 16 and oil level switch 84 are functional, ie., always connected across battery 46, regardless of the position of unit on/off switch 60, and regardless of the position of controller selector switch 70.

The proper oil change interval of internal combustion 14 is a function of the total base number (TBN) level of the engine lubricating oil 88 and the carbon loading of oil 88. The TBN level, which is an indication of moisture, acidity and contaminants, is depleted by the presence of acid formed by NOx exhaust gases combining with condensed water in the crankcase 90. Carbon loading occurs under high load conditions, and is almost directly proportional to engine speed. In other words, high speed operation is generally a higher torque condition than low speed operation, and thus carbon levels are higher at high speed than at low speed. Also, more blow-by gas flows at high speed than at low speed.

With these factors in mind, we have developed a weighting factor between high and low speed operation of a diesel engine driving a refrigerant compressor to more accurately predict when the engine oil reaches a point of reduced TBN level and increased carbon loading where it should be replaced. We have found that this weighting factor between high and low speed operation, using low speed operation of about 1400 RPM and high speed operation of about 2200 RPM, is about two to one. In other words, the hours of operation at high speed should be multiplied by a constant having twice the value of a constant used to scale the number of hours of operation at low speed.

We have found that, on average, a dual speed transport refrigeration unit will operate about 20% of the time at high speed and the remaining time, about 80%, at low speed. For the diesel engines used to drive refrigerant compressors in transport refrigeration units, the engine oil should be changed after 1500 operating hours if the engine runs at the average of 20% at high speed and 80% of low speed, ie., 300 hours at high speed and 1200 hours at low speed. Using the two-to-one weighting factor described above, the average operation of 20% at high speed and 80% at low speed, and the oil change interval of 1500 hours for such "average" operation, we have developed the following equation for dynamically determining the correct oil change interval for any relationship of high speed to low speed engine operation:

$$1.67*300+0.83*1200=1500 \tag{1}$$

The value 1.67 is a constant K2 to provide weighting or scaling for high speed operation; the value 300 is the average operating time at high speed during the "average" oil change interval, ie., 20% of 1500; the value 0.83 is a constant K3 to provide weighting or scaling for low speed operation; the value 1200 is the average operating time at low speed during the "average" oil change interval, ie., 80% of 1500; and the value 1500 is a constant K1 which indicates the desired oil change interval in hours for the "average" mix of high and low speeds.

For different engines, applications, and/or high and low speed operating speeds, equation (1) may be written in general form as follows:

$$K2*\text{high speed hours}+K3*\text{low speed hours}=K1 \tag{2}$$

As hereinbefore stated, constant K1 is the number of hours for an oil change interval at a selected "normal" mix of high and low speed operation, and K2 and K3 are high speed and low speed weighting factors, respectively, with K2 being greater than unity and K3 being less than unity.

Returning to the values of K1, K2 and K3 shown in equation (1) for the transport refrigeration application described, if, during a measured oil change interval, engine 14 is operated 50% of the time at high speed and 50% of the time at low speed, equation (1) would be satisfied after 1200 total hours of engine operating time, ie., 1.67\*600+\*0.83\*600=1500, thus reducing the oil change interval from the "normal" 1500 hours to 1200 hours.

If, during a measured oil change interval, engine 14 is operated at low speed 100% of the time, the oil change interval would be increased from the "normal" 1500 hour interval to 1807 hours, ie., 1.67\*0+0.83\*1807=1500.

Figure 2:
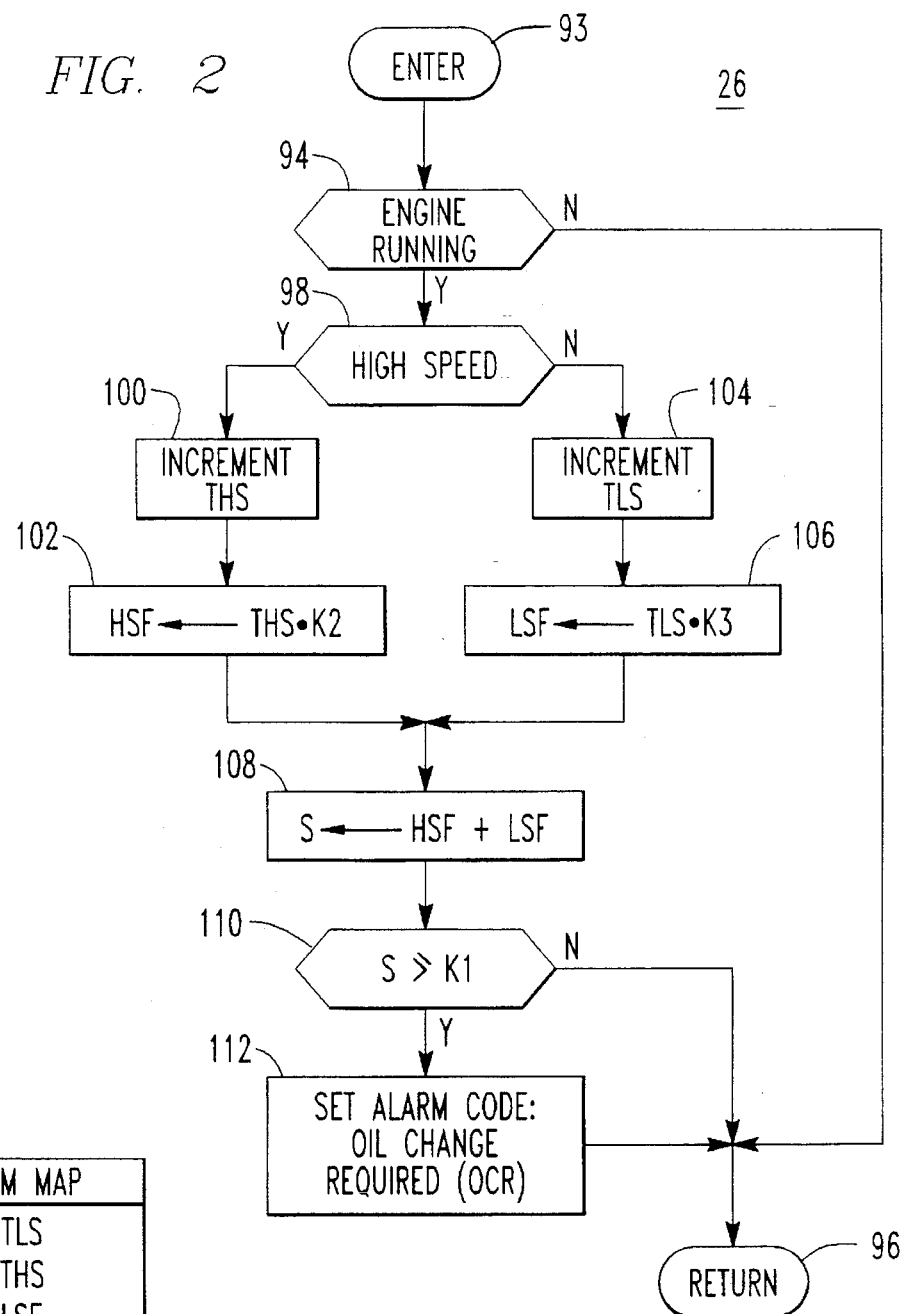
FIG. 2 is a flow diagram of a program which dynamically determines the proper oil change interval of the internal combustion engine shown in FIG. 1, as a function of the time that the engine is run at low speed and the time that the engine is run at high speed since the last oil change.
Figure 3:
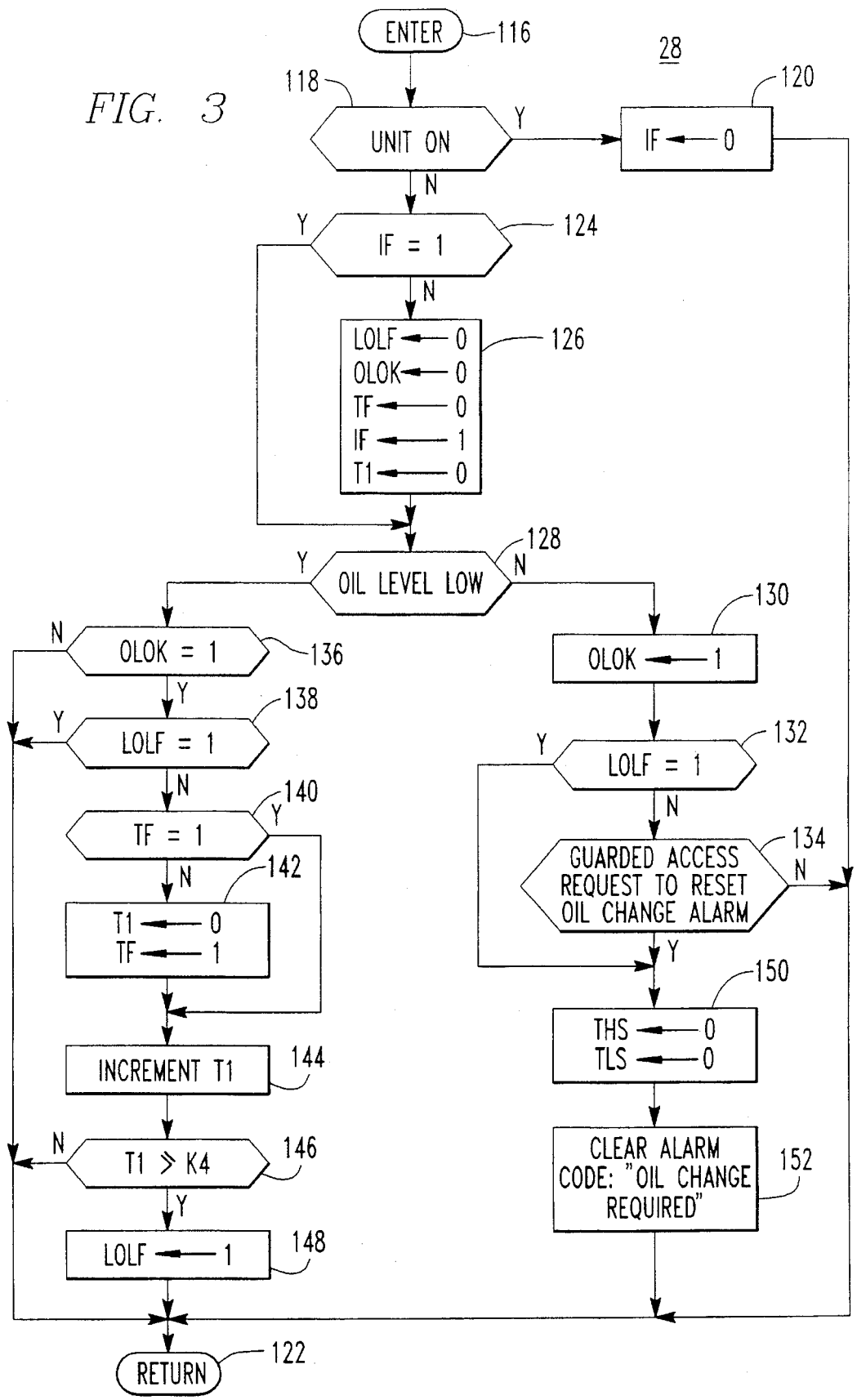
FIG. 3 is a flow diagram of a program which automatically detects the changing of the engine oil, and in response to such detection, the program automatically resets first and second timers which accumulate engine operating time at high and low speed, respectively.

The teachings of the invention which are related to the feature of the invention of dynamically determining a proper oil change interval for an internal combustion engine operable at predetermined low and high speeds are implemented in program 26 shown in a detailed flow chart in FIG. 2. Program 26 is periodically entered at 93 and step 94 determines if engine 14 is running. As shown in the hereinbefore mentioned patents, controller 16 can, for example, determine if a fuel solenoid on engine 14 is energized, or the input of an engine RPM sensor may be checked. If engine 14 is not running, program 26 exits at a program return point 96.

When step 98 finds that engine 14 is running, step 98 determines if engine 14 is running at high speed or at low speed. If controller 16 is providing sinking current for high speed relay 78, engine 14 is running at high speed, and step 98 branches to step 100 which increments a timer THS in RAM 22 which accumulates high speed running time in hours. Step 102 then calculates a high speed factor HSF by multiplying the total accumulated engine running time THS by the high speed weighting constant K2 stored in ROM 20. In the exemplary embodiment of the invention, constant K2 has a value of 1.67, which is stored in look-up table 30 shown in the ROM map 32 of FIG. 4.

When step 98 finds that high speed relay 78 is not energized, step 98 branches to step 104 which increments a timer TLS in RAM 22 which accumulates low speed running time in hours. Step 106 then calculates a low speed factor LSF by multiplying the total accumulated engine running time TLS by the low speed weighting constant K3 stored in ROM 20. In the exemplary embodiment of the invention, constant K3 has a value of 0.83, as indicated in ROM map 30 shown in FIG. 4.

Steps 102 and 106 both proceed to step 108 which adds the high speed factor HSF to the low speed factor LSF, to provide a sum S. Step 110 then compares the sum S with the constant K1. In the exemplary embodiment, constant K1 has a value of 1500, as shown in the look-up table 30 of ROM map 32 in FIG. 4. If the result of the comparison in step 110 finds that the sum S does not equal or exceed the value of constant K1, step 110 exits program 26 at return point 96. When step 110 finds that the sum S equals or exceeds constant K1, step 110 branches to step 112 which sets an alarm code OCR, which indicates that an engine oil change is required. An alarm indicator 40 on display is illuminated, and flashed on and off, if desired, to indicate that an alarm condition exists. An operator can determine the nature of the alarm by calling up the active alarm code on the read-out portion 36 of display 24. The engine oil should then be changed at the first opportunity to do so.

When the engine oil is changed, authorized personnel may reset timers THS and TLS to zero, as well as clear alarm OCR, using a guarded access routine which uses entry codes known only to authorized personnel. In a preferred embodiment of the invention, an oil change is detected automatically, and upon the detection of an oil change, hour meters THS and TLS are automatically reset to zero, and alarm OCR is automatically cleared, making it unnecessary for the reset procedure to be manually performed. Program 28 shown in FIG. 3 implements this feature of the invention.

Program 28 is periodically entered at 116 and step 118 determines if transport refrigeration unit 10 is "on". If unit 10 is operational, an oil change will not be made during this time and step 118 branches to a step 120 which resets an initialization flag IF stored in RAM 22, which flag is illustrated in the RAM map 34 of FIG. 5. Program 28 then exits at a return point 122.

When step 118 finds that transport refrigeration unit 10 is "off" then it is possible that the oil in engine 14 may be changed, and step 118 branches to step 124 which determines if the hereinbefore mentioned initialization flag IF is set. If this is the first running of program 28 after unit 10 is turned off, flag IF will be reset, or a logic zero, and step 124 branches to step 126 to perform certain initialization procedures, including the resetting of certain flags used during the running of program 28, including flags LOLF, OLOK, and TF, the resetting of a timer T1 used in program 28, and the setting of the initialization flag IF. Step 128 then advances to step 128. Upon the next running of program 28, step 124 will now find initialization flag IF set, and step 124 will proceed directly to step 128.

Step 128 determines if the level 86 of the oil 88 in crankcase 90 is below the acceptable range, with controller 16 checking the voltage level of the input from oil level switch 84 to make this determination. If oil level 86 is found to be in the acceptable range, step 128 proceeds to step 130. Step 130 sets flag OLOK which indicates that the oil level was initially in the acceptable range, at the start of this "off" period of unit 10. It is important to know this, as program 28 should not reset the hour timers THS and TLS merely when make-up oil is added, as opposed to a complete oil change.

Step 130 proceeds to step 132 which determines if the low oil level flag LOLF has been set. At this point, flag LOLF will not have been set, and step 132 proceeds to a step 134 which determines if a manual request has been made via a guarded access program to reset hour meters THS and TLS. The provision for manual reset is provided in program 28 in order to enable authorized personnel to reset hour timers THS and TLS after an oil change made when the oil level 86 is below the acceptable range at the time unit 10 is turned off. It will be assumed that no manual request for reset is active, and step 134 exits program 28 at return point 122.

As long as the oil level 86 remains in the acceptable range during this "off"period, program 28 will continue to cycle through steps 118,124,128, 130, 132 and 134, to program return point 122. Should an engine oil change be made, when the oil 88 is drained from engine 14 step 128 will find that oil level switch 84 has closed, to indicate that the oil level is below the acceptable range. Step 128 will then branch to step 136 which checks the logic level of flag OLOK. If the oil level 74 is below the acceptable range when unit 10 is turned off, flag OLOK will still be reset, or a logic zero, and step 136 proceeds immediately to the program return point 122. Program 28 cannot make a proper determination of an oil change in the rare event that the engine oil is below the acceptable range when unit 10 is turned off, as a return of oil level 86 to an acceptable range during this specific unit off time may be due either to make-up oil being added, or an actual oil change. If an actual oil change is made in this instance, then authorized personnel will reset timers THS and TLS, and clear alarm OCR, with an authorized manual reset request being detected by step 134.

When step 136 finds that flag OLOK has been set, it indicates that the oil level was in the acceptable range when unit 10 was turned off, and it is now below the acceptable range. Step 136 then branches to step 138 to determine if the low oil level flag LOLF has been set. At this point flag LOLF will be reset and step 138 proceeds to step 140.

Step 140 initiates a portion of program 28 which insures that the indication of low oil level is not a transitory condition. Step 140 determines if a timer flag TF has been set. At this point, flag TF will be reset, and step 140 advances to step 142 which resets the software timer T1 and which sets timer flag TF. Step 142 proceeds to step 144, which increments timer T1. Upon the next running of program 28, step 140 will now find timer flag TF set, and step 140 will proceed directly to step 144, by-passing the initialization step 142.

After step 144 increments timer T1, step 146 compares the value of timer T1 with a predetermined constant K4 which has a value selected to insure that the low oil condition persists for a predetermined period of time and thus insure that the low oil detection is not transitory. Of course, the value of constant K4 should not be so long that the oil can be drained and replaced during the K4 time. For purposes of example, a period of 5 minutes has been selected, as indicated in ROM map 30 in FIG. 4, but other reasonable values may be used. When step 146 finds that timer T1 has not reached the time value indicated by constant K4, step 146 exits program 28 at 122.

When the oil level 86 remains below the acceptable range for the time period of constant K4, step 146 branches to step 148, which sets low oil level flag LOLF, to indicate that while the oil level was in the acceptable range when unit 10 was turned off, a true low engine oil level has now been detected. As long as the oil level remains low after flag LOLF is set, program 28 will continue to follow steps 128, 136, and 138 to the program return point 122.

After new oil has been added to crankcase 90, oil level switch 84 will open and on the next running of program 28 step 128 will now find that oil level 86 is in the acceptable range. Step 130 will set the already set flag OLOK and step 132 will now find that the low oil level flag 132 is set. Step 132 then proceeds to step 150 which resets the high speed and low speed hour timers THS and TLS, respectively. Step 150 then proceeds to step 152 which clears the alarm code OCR. Step 152 will also turn off alarm indicator 40, if there are no other active alarms registered.

In the hereinbefore mentioned rare event that unit 10 is turned off while the oil level 74 is below the acceptable range, and an oil change is made, authorized personnel will initiate a guarded access request to reset the hour meters THS and TLS, as well as to clear alarm OCR. This manual reset request is recognized in step 134, and step 134 will branch to the hereinbefore described steps 150 and 152 to reset timers THS and TLS, and to clear the oil change alarm OCR.

We claim:

1. A method of dynamically determining engine oil change intervals for an internal combustion engine having selectable high and low operating speeds HS and LS, respectively, comprising the steps of:

accumulating operating time THS of the internal combustion engine at speed HS, accumulating operating time TLS of the internal combustion engine at speed LS, calculating a high speed factor HSF as a function of the accumulated engine operating time THS, calculating a low speed factor LSF as a function of the accumulated engine operating time TLS, detecting when the engine oil of the internal combustion engine has been changed, including the steps of sequentially detecting (i) a drop in engine oil level below a predetermined level and (ii) an increase in engine oil level above a predetermined level, resetting the accumulated high and low speed operating times THS and TLS, respectively, when the detecting step detects that the engine oil has been changed, summing the high speed and low speed factors HSF and LSF to provide a sum S, providing a predetermined constant K1, comparing the sum S with the predetermined constant K1, and providing a signal indicating the engine oil should be changed when the comparison step finds the sum S has reached the predetermined constant K1.

2. The method of claim 1 wherein the step of calculating the high speed factor HSF includes the steps of providing a predetermined constant K2 having a value greater than unity, and multiplying the accumulated high speed operating time THS with the predetermined constant K2, and the step of calculating the low speed factor LSF includes the steps of providing a predetermined constant K3 having a value less than unity, and multiplying the accumulated low speed operating time TLS with the predetermined constant K3.

3. The method of claim 1 wherein the step of calculating the high speed factor HSF includes the steps of providing a predetermined constant K2, and multiplying the accumulated high speed operating time THS with the predetermined constant K2, and the step of calculating the low speed factor LSF includes the steps of providing a predetermined constant K3, and multiplying the accumulated low speed operating time TLS with the predetermined constant K3, with the values of the constants K2 and K3 being selected such that the value of constant K2 is about twice the value of constant K3.

4. The method of claim 1 wherein the step of calculating the high speed factor HSF multiplies the accumulated high speed operating time THS with predetermined constant K2 having a value of about 1.67, and the step of calculating the low speed factor LSF multiplies the accumulated low speed operating time TLS with a predetermined constant K3 having a value of about 0.83.

5. The method of claim 1 wherein the value of the predetermined constant K1 is the oil change interval in hours using first and second predetermined percentages of high speed and low speed operating time, respectively.

6. The method of claim 5 wherein the predetermined percentages of high speed and low speed operating time are about 20% and 80%, respectively, and the value of the predetermined constant K1 is about 1500.

7. A method of dynamically determining engine oil change intervals for an internal combustion engine having selectable high and low operating speeds HS and LS, respectively, comprising the steps of:

accumulating operating time THS of the internal combustion engine at speed HS, accumulating operating time TLS of the internal combustion engine at speed LS, calculating a high speed factor HSF as a function of the accumulated engine operating time THS, calculating a low speed factor LSF as a function of the accumulated engine operating time TLS, detecting when the engine oil of the internal combustion engine has been changed during an engine off cycle, including the steps of sequentially detecting (i) a drop in engine oil level below a predetermined level which persists for at least a predetermined period of time and (ii) an increase in engine oil level above a predetermined level, resetting the accumulated high and low speed operating times THS and TLS, respectively, when the detecting step detects that the engine oil has been changed, summing the high speed and low speed factors HSF and LSF to provide a sum S, providing a predetermined constant K1, comparing the sum S with the predetermined constant K1, and providing a signal indicating the engine oil should be changed when the comparison step finds the sum S has reached the predetermined constant K1.

8. The method of claim 7 wherein the step of calculating the high speed factor HSF includes the steps of providing a predetermined constant K2 having a value greater than unity, and multiplying the accumulated high speed operating time THS with the predetermined constant K2, and the step of calculating the low speed factor LSF includes the steps of providing a predetermined constant K3 having a value less than unity, and multiplying the accumulated low speed operating time TLS with the predetermined constant K3.

9. The method of claim 7 wherein the step of calculating the high speed factor HSF includes the steps of providing a predetermined constant K2, and multiplying the accumulated high speed operating time THS with the predetermined constant K2, and the step of calculating the low speed factor LSF includes the steps of providing a predetermined constant K3, and multiplying the accumulated low speed operating time TLS with the predetermined constant K3, with the values of the constants K2 and K3 being selected such that the value of constant K2 is about twice the value of constant K3.

10. The method of claim 7 wherein the step of calculating the high speed factor HSF multiplies the accumulated high speed operating time THS with predetermined constant K2 having a value of about 1.67, and the step of calculating the low speed factor LSF multiplies the accumulated low speed operating time TLS with a predetermined constant K3 having a value of about 0.83.

11. The method of claim 7 wherein the value of the predetermined constant K1 is the oil change interval in hours using first and second predetermined percentages of high speed and low speed operating time, respectively.

12. The method of claim 11 wherein the predetermined percentages of high speed and low speed operating time are about 20% and 80%, respectively, and the value of the predetermined constant K1 is about 1500.

* * * * *